(12) United States Patent
Yamin et al.

(10) Patent No.: US 8,313,860 B2
(45) Date of Patent: Nov. 20, 2012

(54) LITHIUM CELL AND METHOD OF FORMING SAME

(75) Inventors: Herzel Yamin, Rehovot (IL); Chen Menachem, Holon (IL); Dany Bar-Tov, Har Adar (IL)

(73) Assignee: Tadiran Batteries Ltd., Kiryat Ekron (IL)

( * ) Notice: Subject to any disclaimer, the term of this patent is extended or adjusted under 35 U.S.C. 154(b) by 0 days.

(21) Appl. No.: 10/950,485

(22) Filed: Sep. 28, 2004

(65) Prior Publication Data

US 2006/0068291 A1 Mar. 30, 2006

(51) Int. Cl.
*H01M 4/48* (2010.01)
*H01M 4/52* (2010.01)
*H01M 4/525* (2010.01)

(52) U.S. Cl. ...... 429/231.1; 429/50; 429/60; 429/231.3; 429/231.4; 429/231.8; 29/623.1

(58) Field of Classification Search .......... 429/60, 429/231.8, 231.95, 50, 231.9, 231.1–231.4; 29/623.1
See application file for complete search history.

(56) References Cited

U.S. PATENT DOCUMENTS

| 4,423,125 | A | 12/1983 | Basu et al. |
| 4,828,834 | A | 5/1989 | Nagaura et al. |
| 5,028,500 | A | 7/1991 | Fong et al. |
| 5,252,413 | A | 10/1993 | Alamgir et al. |
| 5,576,119 | A | 11/1996 | Yamin et al. |
| 6,884,546 | B1 * | 4/2005 | Fujita et al. ............ 429/231.9 |

FOREIGN PATENT DOCUMENTS

WO    WO 0122519 A1 * 3/2001

OTHER PUBLICATIONS

D. Peramunag et al., "Preparation and Electrochemical Characterization of Overlithiated Spinel LiMn2O4", J. Electrochem. Soc. vol. 145, No. 4, Apr. 1998, pp. 1131-1136.*

* cited by examiner

*Primary Examiner* — Gregg Cantelmo
(74) *Attorney, Agent, or Firm* — Daniel J. Swirsky; AlphaPatent Associates Ltd.

(57) ABSTRACT

High capacity primary and rechargeable cells may include a cathode with a lithiated active cathode material and an anode including lithium intercalating carbonaceous material. The cells may also include a separator impregnated with a liquid electrolyte or a solid electrolyte. The ratio of the capacity to reversibly incorporate lithium ions of the cathode to the capacity to reversibly incorporate lithium ions in the form of $LiC_6$ of the carbonaceous material of the anode is equal to or larger than 2:1. During charging a high grade high density substantially non-dendritic lithium metal layer is plated on the anode.

10 Claims, 2 Drawing Sheets

LITHIUM CELL AND METHOD OF FORMING SAME

FIELD OF THE INVENTION

The present invention relates generally to the field of electrical batteries and more specifically to the field of primary and rechargeable lithium electrochemical cells having non-aqueous solvents.

BACKGROUND

Various types of lithium electrochemical cells in non-aqueous solvents are known in the art. Primary solid cathode lithium cells typically include a lithium anode, an electrolyte prepared from lithium salts dissolved in one or more organic solvent and a cathode containing electrochemically active materials such as transition metal oxides, metal sulfides, fluorinated carbon compounds, etc.

One of the drawbacks of such prior art lithium cell arises from the highly reactive nature of the lithium metal in air. Lithium readily reacts with water vapor in air. Therefore, lithium anodes must be prepared in an entirely dry atmosphere. The preparation of metallic lithium anodes is therefore cumbersome, expensive and may also be hazardous.

Another drawback of commercially available solid cathode primary lithium cells is that their operating voltage varies in a range of 1.5-3.3 Volts. There are currently no primary lithium cells based on metallic lithium with a solid cathode that operate at 3.5-4.1 Volts.

Another drawback of primary lithium cells is encountered in high-power primary lithium cell designs where a thin metallic lithium anode is required. A common problem in such high power cells is the low tensile strength of metallic lithium. The preparation of metallic lithium anodes may therefore require the use of excess lithium in the anode to increase the thickness of the lithium in the anode (in order to provide better mechanical strength), or the incorporation into the anode of an electrically conducting support such as a metallic or a metalized supporting foil or supporting mesh (for example, a copper or nickel foil or mesh or another metal plated with gold or chromium or the like, may be used to increase the anodes mechanical strength) or another suitable electrically conducting support or the like. The use of such a conducting support (onto which the lithium is plated or deposited or attached), suitably increases the anode's mechanical strength.

The first approach (excess lithium) markedly reduces the practical energy density (available energy per volume unit) achievable by the cell. The second approach (using a thin conducting support) may markedly complicate the anode manufacturing process because a vacuum deposition method or other similar manufacturing methods may have to be used to deposit the thin layer of metallic lithium on the conducting support. Such techniques are inefficient for mass production processes, may require costly equipment and may have to be performed in batch.

One approach to overcome the low operating voltage problem encountered with the currently available primary lithium cells is to use cathode materials such as transition metal oxides (or transition metal chalcogenides) in combination with carbonaceous anodes based on graphite or petroleum coke capable of intercalating lithium ions. In using this approach, lithium ions have to be removed from the lithiated cathode by an externally applied charging current and intercalated into the carbonaceous anode.

This approach, while increasing the cell's operating voltage, has two main drawbacks. The first drawback is a very high self-discharge rate of the resulting cells (typically about 5% of the cell's charge per month). While such a high self-discharge rate value may be commercially acceptable for rechargeable lithium cells, it is not acceptable for most of primary lithium cells for which a loss of up to 0.1% of the cell's charge per month is typically required. The second drawback of commercially available high-voltage lithium cells is the low energy density as compared to primary lithium cells. The main reason for this low energy density arises from the low theoretical capacity value of the carbonaceous anode in comparison to a lithium metal anode. Such carbonaceous anodes may deliver up to 372 mAh/gr while lithium metal anodes may theoretically provide values of 3860 mAh/gr.

As for rechargeable electrochemical lithium cells, various types of non-aqueous rechargeable lithium cells are known in the art. Rechargeable lithium cells, such as the cells described in U.S. Pat. No. 4,828,834 (Nagaura at al), incorporated herein by reference in its entirety for all purposes, include a highly electroactive metallic lithium based anode, a lithium salt, organic solvents and an electrochemically active cathode. In such cells, during discharge, lithium ions pass from the anode through the liquid electrolyte and are intercalated into the cathode. During the charging of the cell, the flow of ions is reversed. Lithium ions pass from the cathode through the electrolyte and are deposited back as metallic lithium atoms on the lithium anode. The quality of the lithium layer deposited or plated on the anode during the charging of the cell is not good enough for many charge discharge cycles. This kind of lithium deposition tends to yield a high surface area plating form known as dendrites. Such dendrites typically continue to grow upon cycling of the cell. Unfortunately, lithium dendrite formation limits the number of permissible charging/discharge cycles, as eventually the dendrites may contact the cathode which may result in cell failure. Dendritic lithium formation in rechargeable cells may thus make such cells inherently less stable since if such a cell short-circuit occurs, the cell may explode.

Moreover, the high-surface area dendritic lithium on the anode's surface tends to react with the electrolyte to form an electrically isolated non-active substance. As a result, the amount of the remaining lithium available in the cell decreases, reducing the practically achievable energy density of the cell.

It may be possible to partially overcome this low efficiency resulting from the low quality of the lithium plating during the charging half-cycle by including a large excess of lithium metal in the cell (typically a four fold excess-as compared to the practical capacity of the cathode). However, using excess of lithium in the cell increases the thickness of the anode and therefore undesirably decreases the practically achievable energy density of the cell. Moreover, using a larger quantity of lithium is inherently more dangerous, decreasing overall cell safety, and, as lithium is a comparatively expensive metal, increasing the cell's cost.

A different approach used to improve the number of charge/discharge cycles is to use a rechargeable cell having a carbonaceous anode as described in U.S. Pat. No. 4,423,125 (Basu et al.), incorporated herein by reference in its entirety for all purposes, and in U.S. Pat. No. 5,028,500 (Fong et al.), incorporated herein by reference in its entirety for all purposes. These cells include a carbonaceous anode including a suitable carbon form such as coke or graphite intercalated with lithium ions to form $Li_xC_6$ where X<1. As taught by Fong et al., typical graphite compositions will take up between 0.5 and 1 mole of lithium for each 6 moles of carbon included in the carbonaceous anode composition.

At X=1, the maximum theoretical capacity of graphite is only 372 mAh/g graphite in comparison to 3860 mAh/gr for pure lithium metal. As noted by Basu et al., deposition of lithium on carbon beyond $Li_1C_6$ tends to be highly reactive with organic electrolyte solvents, which are typically used in lithium cells. The ensuing side reactions may lead to lithium loss in the anode and may ultimately cause cell failure. Thus, to quote from Basu et. al. "Such freshly reduced elemental lithium on an anode surface tends to be highly reactive with organic electrolyte solvents which are typically used in lithium batteries. Such side reactions lead to the loss of lithium from the anode and can cause ultimate cell failure. Thus, by substantially reducing their presence one can increase the rechargeability of such a battery". It is thus clear that the deposition of highly reactive lithium metal on the carbonaceous anode of such prior art lithium cells is problematic.

Another approach to increase the energy density of rechargeable lithium cells beyond the energy obtained with intercalated carbon is described in U.S. Pat. No. 5,576,119 to Yamin et al), incorporated herein by reference in its entirety for all purposes. Yamin et al. disclose a rechargeable electrochemical cell having an anode including a thin layer of electrically conductive material such as copper or nickel and a cathode including a lithiated metal oxide on an aluminum supporting foil. Lithium deposition on the anode is accomplished in-situ during the first charge of the cell. The drawback of this approach is the relatively low number of charge/discharge cycles attainable that results from the poor quality of lithium metal deposition on the surface of the conductive material of the anode.

SUMMARY OF THE INVENTION

There is therefore provided, in accordance with an embodiment of the present invention, an electrochemical cell. The cell includes an anode including a carbonaceous material. The carbonaceous material is capable of reversibly incorporating lithium ions therein and lithium metal on the surface thereof. The cell also includes a cathode capable of reversibly incorporating therein lithium ions and a non-aqueous electrolyte in contact with the anode and the cathode. The ratio of the capacity to reversibly incorporate lithium ions of the cathode to the capacity to reversibly incorporate lithium ions in the form of $LiC_6$ of the carbonaceous material of the anode is equal to or larger than 2:1.

Furthermore, in accordance with an embodiment of the present invention, the anode may include an electrically conducting support member and the carbonaceous material maybe attached to the support member.

Furthermore, in accordance with an embodiment of the present invention, the electrically conducting support member may include a material selected from the group consisting of an electrically conducting polymer, an electrically conducting material, a metal, copper, nickel, stainless steel, chromium, gold, and combinations thereof.

Furthermore, in accordance with an embodiment of the present invention, the cell is selected from a primary electrochemical cell and a rechargeable electrochemical cell.

Furthermore, in accordance with an embodiment of the present invention, the carbonaceous material may include, but is not limited to, a substance selected from graphite, coke, petroleum coke, carbon, partially or fully graphitized carbon forms, carbon-black, hard carbon and combinations thereof.

Furthermore, in accordance with an embodiment of the present invention, the carbonaceous material may be formed as a layer having a thickness less than 50 microns, preferably less than 10 microns, and more preferably less than 2 microns.

Furthermore, in accordance with an embodiment of the present invention, the electrolyte may include one or more non-aqueous solvents and at least one lithium salt dissolved in said one or more non-aqueous solvents.

Furthermore, in accordance with an embodiment of the present invention, the cell may further include a separator for separating the cathode from said anode, and the electrolyte may impregnate the separator.

Furthermore, in accordance with an embodiment of the present invention, the electrolyte may be a solid ion-conducting polymer in contact with the anode and the cathode.

Furthermore, in accordance with an embodiment of the present invention, the cell in the charged state may include a layer of metallic lithium deposited on the carbonaceous material.

Furthermore, in accordance with an embodiment of the present invention, the cathode may include a lithiated transition metal intercalation active material.

Furthermore, in accordance with an embodiment of the present invention, the lithiated transition metal intercalation active material may include one or more compounds selected from a lithiated transition metal oxide, a lithiated transition metal salt, a mixed lithiated transition metal oxide, a mixed lithiated transition metal salt, and a lithiated metal phosphate. Examples of cathode active material(s) may include, but are not limited to, $LiCoO_2$, $LiNiCoO_2$, $LiMnNiCoO_2$, $LiAlNiCoO_2$, $LiMnO_2$, $Li_2Mn_2O_4$, $LiV_2O_5$, and $LiFe(PO_4)$.

Furthermore, in accordance with an embodiment of the present invention, the cathode may include an electrically conducting support member and the lithiated transition metal intercalation active material may be attached to the support member.

There is also provided, in accordance with an embodiment of the present invention, an electrochemical cell. The cell includes an anode including an electrically conducting support member and a carbonaceous material attached to the support member. The carbonaceous material is capable of reversibly incorporating lithium ions therein and lithium metal on the surface thereof. The cell also includes a cathode capable of reversibly incorporating therein lithium ions, and a non-aqueous electrolyte. Prior to charging the cell, the cathode is lithiated by an amount of lithium ions that is equal to or larger than twice the capacity of the carbonaceous material of the anode to intercalate therein lithium ions in the form of $LiC_6$.

There is also provided, in accordance with an embodiment of the present invention, a method for constructing an electrochemical cell. The method includes the step of providing an anode including an electrically conducting support member and a carbonaceous material attached to the support member. The carbonaceous material is capable of reversibly incorporating lithium ions therein and lithium metal on the surface thereof. The method also includes the step of providing a cathode capable of reversibly incorporating therein lithium ions. The ratio of the reversible capacity to incorporate lithium ions of the cathode to the reversible capacity for incorporating lithium ions in the form of $LiC_6$ of the carbonaceous material of the anode is equal to or larger than 2:1. The method also includes the steps of providing a non-aqueous electrolyte and assembling the cathode, the anode and the electrolyte in a housing to obtain the electrochemical cell.

There is also provided, in accordance with an embodiment of the present invention, a method for constructing an electrochemical cell. The method includes the step of providing an anode including a carbonaceous material attached to a support member. The carbonaceous material is capable of reversibly incorporating lithium ions therein and lithium metal on the surface thereof. The method also includes the step of providing a cathode capable of reversibly intercalating therein lithium ions. In the cell's discharged state the cathode is lithiated by an amount of lithium ions that is equal to or larger than twice the capacity of the carbonaceous material of the anode to intercalate therein lithium ions in the form of $LiC_6$. The method also includes the step of providing a non-aqueous electrolyte. The method also includes the step of assembling the cathode, the anode and the electrolyte in a housing to obtain the electrochemical cell.

Furthermore, in accordance with an embodiment of the present invention, the method further includes the step of sealing the housing.

Furthermore, in accordance with an embodiment of the present invention, the method further includes the step of charging the electrochemical cell after the step of assembling.

Furthermore, in accordance with an embodiment of the present invention, the method further includes the step of charging the electrochemical cell to deposit lithium metal on the carbonaceous material.

Furthermore, in accordance with an embodiment of the present invention, the depositing of lithium metal on the carbonaceous material increases the internal pressure within the cell to reduce lithium dendrite formation.

Furthermore, in accordance with an embodiment of the present invention, the support member is an electrically conducting support member.

BRIEF DESCRIPTION OF THE DRAWINGS

The invention is herein described, by way of example only, with reference to the accompanying drawings, in which like components are designated by like reference numerals, wherein.

DETAILED DESCRIPTION OF THE INVENTION

Notation Used Throughout

The following notation is used throughout this document.

| Term | Definition |
|------|------------|
| DEC | Diethyl Carbonate |
| DMC | Dimethyl Carbonate |
| EC | Ethylene Carbonate |
| EMC | Ethyl Methyl Carbonate |
| mA | Milliampers |
| mAh | Milliampers hour |
| mAh/gr | milliampers-hour per gram |
| PC | Propylene Carbonate |
| PVDF | Poly Vinylidene Di fluoride |

The present invention provides improved primary and rechargeable lithium cells having high energy density and high operating voltage.

Figure 1:
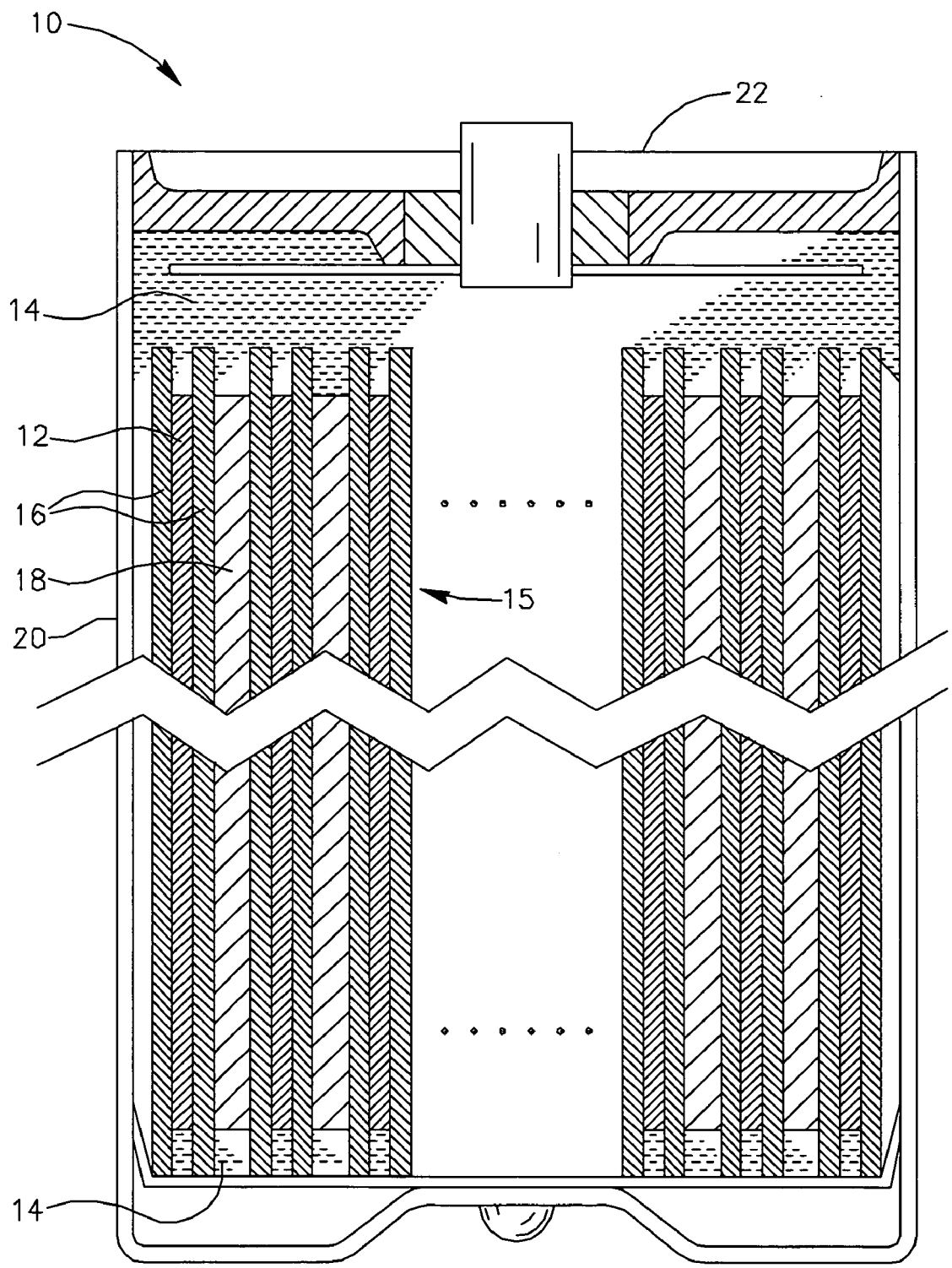
FIG. 1 is a schematic cross sectional diagram of an electrochemical cell in accordance with an embodiment of the present invention.

Reference is now made to FIG. 1 which is a schematic cross sectional diagram of an electrochemical cell in accordance with an embodiment of the present invention. The cell 10 may include an anode 12, a cathode 18, the cell 10 may also include an electrically non-conducting porous separator 16 disposed between the anode 12 and the cathode 18 to prevent contact therebetween. The cell 10 may also include a non-aqueous lithium based electrolyte 14. The electrolyte 14 may be a lithiated liquid electrolyte, as is known in the art as described in detail hereinafter. If the electrolyte 14 is a liquid electrolyte, the electrolyte 14 impregnates the separator 16 and is in contact with the anode 12 and the cathode 18. The anode 12, the cathode 18, the electrolyte 14 and the separator 16 are described in detail hereinafter.

The cell 10 may also include a cell housing 20 which may be made from nickel plated steel or from any other suitable material as is known in the art. The anode 12, the separator 16 and the cathode 18 may by stacked together to form a cell's stack 15. The stack 15 may be spirally wound on an inner core (core not shown) as is known in the art, and inserted into the housing 20. The electrolyte 14 may be introduced into the cell and a cap 22 may be suitable attached to the housing 20 to seal the cell 10. The anode 12 and the cathode 18 are suitably electrically connected to the terminals of the cell 10 (the connections are not shown for the sake of clarity of illustration) as is known in the art.

In accordance with another embodiment of the present invention, if the electrolyte used is a solid polymer electrolyte, as is known in the art, the cell does not include the separator 16, and a solid electrolyte (not shown in FIG. 1) may be disposed between the anode 12 and the cathode 18 to form the cell's stack, as is known in the art.

Figure 2:
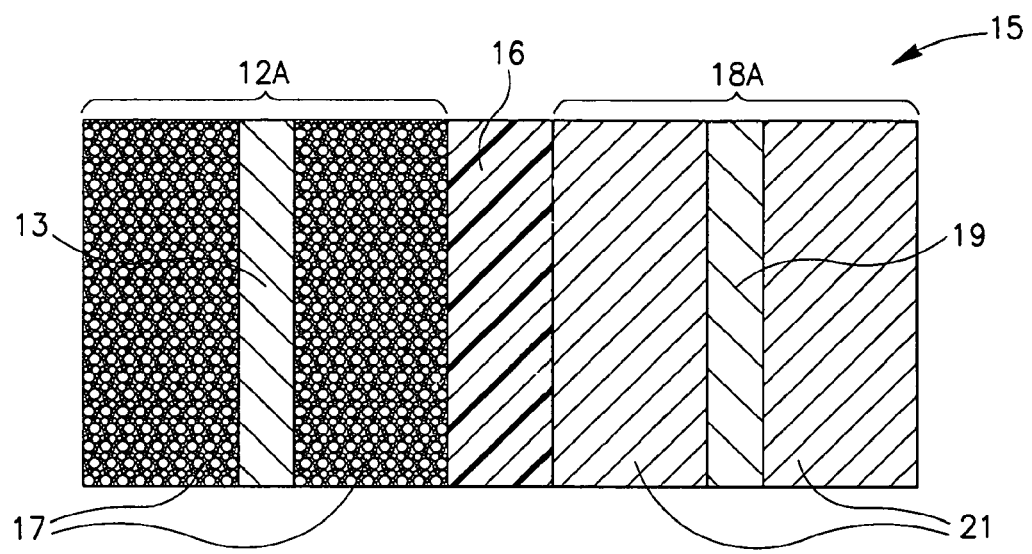
FIG. 2. is a schematic cross-sectional view of part of an electrode stack of a rechargeable electrochemical cell in accordance with an embodiment of the present invention.

Reference is now made to FIG. 2. which is a schematic cross-sectional view of part of an electrode stack of a rechargeable electrochemical cell in accordance with an embodiment of the present invention.

FIG. 2 illustrates part of a stack 15 which may be used in the cell 10 of FIG. 1. In accordance with an embodiment of the present invention, the stack 15 of the rechargeable electrochemical cell may include an anode 12A, a cathode 18A and a separator 16. The anode 12A is capable of reversibly incorporating (or intercalating) lithium ion therein and lithium metal on the surface thereof. The anode 12A may include an electrically conducting support member 13. The support member 13 may preferably include a thin layer (or a foil, or a mesh, or any other suitably formed layer) of an electrically conducting material, such as, but not limited to copper or nickel or other suitable metals, an electrically conducting polymer, or any other suitable electrically conducting material(s) or combinations of electrically conducting materials, the support member 13 may also be plated or coated with a thin electrically conducting material. For example, the support member 13 may be a copper foil or copper mesh plated or coated with gold or chromium or the like. The thickness of the support member 13 is preferably 5-100 microns and more preferably 10-20 microns, but other values of thickness may also be used.

The support member 13 is coated (preferably on both sides thereof) with a layer of suitable carbonaceous material 17 that is capable of reversibly intercalating lithium ions, such as, but not limited to, graphite, coke, petroleum coke, carbon, partially or fully graphitized carbon forms, carbon-black, hard carbon or any other suitable carbonaceous material or carbon form known in the art that is capable of intercalating therein lithium ions. The thickness of the layer of carbonaceous material 17 may depend on the capacity and hence on the thickness of the lithiated active material of the cathode 18A. The preferred thickness of the carbonaceous material 17 may be approximately 0.5%-20% of the thickness of the active cathode material 21. Thus, typically for an active cathode material 21 coating having a thickness of 100 microns, the preferred thickness of the carbonaceous material 17 of the anode 12A may be in the range of 0.5-20 microns. This large difference in the thickness between active cathode material 21 and carbonaceous material 17 enables the in-situ deposition of a substantial part of the cell's capacity in the form of lithium metal during the charging of the cell. This is in direct contrast to the prior art cells that are designed to substantially reduce or avoid any lithium plating reactions that may take place on the carbonaceous material of the cell's anode.

The stack 15 may also include a cathode 18A capable of reversibly incorporating therein lithium ions. For example, the lithiated cathode 18A may include an electrically conducting support member 19. The support member 19 may preferably include a thin layer (or a foil, or a mesh, or any other suitably formed layer) of an electrically conducting material, such as, but not limited to aluminum or stainless steel or other suitable metals, an electrically conducting polymer, or any other suitable electrically conducting material(s) or combinations of electrically conducting materials, the support member 19 may also be plated or coated with a thin electrically conducting material. For example, the support member 19 may be a copper foil or copper mesh plated or coated with gold or chromium or the like.

The cathode 18A may also include an electrochemically active cathode material 21, coating or attached to one side or, preferably, to both sides of the support member 19. The active cathode material 21 may include, for example, a lithiated transition metal intercalation active material or lithiated metal oxides, or other lithiated transition metal compounds, as is known in the art, such as, but not limited to $LiCoO_2$, $LiNiCoO_2$, $LiMnNiCoO_2$, $LiAlNiCoO_2$, $LiMnO_2$, $LiV_2O_5$, $Li_2Mn_2O_4$, $LiFe(PO_4)$ and combinations thereof, but may also include any other suitable mixed salts or mixed oxides containing lithium and one or more transition metals, as is known in the art. The active cathode material 21 may also include any suitable binder(s) such as but not limited to PVDF, or any other suitable binder known in the art, and/or materials for increasing the electrical conductivity of the active cathode material, such as, but not limited to carbon black powder, or the like. Other suitable additives may also be included in the active cathode material, as is known in the art.

The stack 15 may also include a separator 16 disposed between the anode 12A and the cathode 18A. The separator 16 may be any suitable porous non-electrically conducting material, such as, but not limited to, microporous polypropylene (cellgard type 2325), or any other suitable separator.

Within the cell 10, the stack 15 may be in contact with the non-aqueous electrolyte 14 filing the cell and impregnating the separator 16. The non-aqueous electrolyte 14 may include, for example, a solution of lithium salt(s) in an organic non-aqueous solvent or solvent mixture. For example, the lithium salt(s) may include but are not limited to $LiPF_6$, $LiAsF_6$, $LiClO_4$, $LiCF_3SO_3$, $LiN(CF_3SO_2)_2$, $LiBF_4$ and the like. The solvent may include but is not limited to, PC, EC, DMC, DEC, EMC or various suitable mixtures thereof. Alternatively, the electrolyte 14 and the electrically non-conductive porous separator 16 may be replaced with a solid polymer electrolyte. For example, the separator 16 may be omitted from the stack 15 and a layer of solid electrolyte (not shown) such as the one described in U.S. Pat. No. 5,252,413 to Alamgir, or any other suitable solid polymer electrolyte known in the art may be interposed between the anode 12A and the cathode 18A of the stack 15. The solid electrolyte may also be any suitable solid ion conductive polymer, known in the art.

Prior to charging of a cell including the stack 15, the surface of the anode 12A is substantially free of intercalated lithium ions or lithium metal and the cathode 18A is lithiated by at least twice the capacity of the anode 12A to intercalate therein lithium ions to form $Li_xC_6$ (wherein x is equal to or less than 1). During charging of the cells of the present invention by an external current, lithium ions from the lithiated cathode 18A pass through the electrolyte 14 to the anode 12A. Initially, at a first stage of the charging of the cell, the lithium ions are intercalated in the carbonaceous material 17 as is known in the art. At the completion of this initial stage, there is a second stage of the charging in which lithium metal atoms start to deposit on the surface of the carbonaceous material 17 of the anode 12A to form a dense uniform metallic lithium layer (not shown in FIG. 2) with excellent adhesion to the carbonaceous material 17. In a contrast to the dendritic lithium plating occurring in prior art lithium electrochemical cells, the plated metallic lithium layer formed in the cells of the present invention is very dense and has a very low surface area. While the reasons for the formation of the high grade, dense lithium layer are not presently fully understood, this high-grade lithium plating may be the result of the formation of a surface substantially free from imperfections of the substrate that exists prior to the plating.

In contrast to the dense substantially non-dendritic lithium layer formed during charging in the cells of the present invention, lithium layers that are formed on an imperfect substrate of prior art anodes typically contain a non uniform layer of oxides, carbonates or nitrates which exist on metallic lithium electrodes or on other metal substrates used in electrodes, and which may cause dendrite formation and lower the density of the plated lithium metal.

During the charging of the cell, the anode may reversibly incorporate therein lithium ions as $Li_xC_6$ (wherein x=0-1). As the charging is continued lithium metal may be deposited on both sides of the surface of the anode 12A. A feature of the cell described in the present invention is that the ratio of the capacity of the lithiated cathode 18A to intercalate therein lithium ions to the capacity of the anode 12A to incorporate lithium ions as $Li_1C_6$ therein is equal to or larger than 2:1. Therefore during the charging process (by an applied external current), a relatively small portion of the lithium ions migrating from the cathode 18A is intercalated within the carbonaceous material 17 of the anode 12A to form $Li_xC_6$ (wherein x=0-1), and most of the lithium ions migrating from the cathode 18A during charging is plated or deposited on the surface of the anode as substantially pure lithium metal. Thus, after the charging process is completed the anode of the cell comprises the electrically conducting support member 13, the layer carbonaceous material 17 containing intercalated lithium ions, and a layer of lithium metal (not shown) attached to the lithiated carbonaceous material 17 of the anode 12A.

The thin carbonaceous material 17 assists the formation of the high-grade lithium plating. During the charging process by external currents lithium ions leave the cathode 18A, pass through the non-aqueous electrolyte 14 and are intercalated within the carbonaceous material 17 of the anode 12A. As the charging proceeds the carbonaceous material 17 becomes further saturated by lithium ions while the deposition process of lithium metal gradually increases. At this stage a dynamic equilibrium between lithium metal deposition sites and lithium intercalation sites may be reached. Lithium atoms may leave the metal sites and become intercalated within the carbonaceous material, while lithium ions may leave the intercalation sites and become incorporated as lithium metal atoms at the metallic lithium sites. Thus, a dynamic quasi-equilibrium may occur during charging. This quasi-equilibrium mechanism may result in leveling of the plated or deposited metallic lithium surface and may contribute to the formation of a uniform dense layer on the atomic scale with excellent adhesion of the deposited metallic lithium onto the layer of carbonaceous material 17 of the anode 12A.

The characteristics of the electrochemical cells of the present invention such as the number of charge-discharge cycles, the self-discharge rate as well as the cell's safety depend, among others, on the characteristics of the metallic lithium layer plated at the anode. In contrast to sponge-like high surface area dendritic lithium plating which occurs in prior art lithium cells, the lithium metal layer plated on the anode of the electrochemical cells of the present invention has a typical shiny appearance, is of high grade, is very dense and has a low surface area, indicative of a relatively low dendrite formation. Therefore, the cells of the present invention may be used as primary cells due to their low self discharge rate. The cells may also be used as high-voltage secondary (rechargeable) cells that can deliver many charge/discharge cycles.

The surface of the substrate on which the lithium is plated in the cells of the present invention is formed in-situ before and during the intercalation process and may form prior to the second lithium metal plating stage of the charging half-cycle. In addition, for an electrochemical cell of the present invention with a given capacity, the thickness of the carbonaceous material layer(s) 17 is relatively small in comparison to lithium-Ion cells currently known in the art. In prior art lithium-ion cells the ratio of the lithium intercalation capacity of the anode carbonateous material to the lithium intercalation capacity of the lithiated active cathode material is typically 1.2:1 and the minimum ratio is 1:1 in order to avoid any deposition of metallic lithium on the lithium anode of the prior art lithium-Ion cells, as compared to a ratio of at least 1:2 in the lithium cells of the present invention. Therefore, the freshly formed lithium intercalated in the carbonaceous material of the anode 12A contributes to the uniformity of the lithium plating, which favorably affects the electrochemical performance of the cell.

This type of plating leads to relatively very efficient charge and discharge half-cycles with a relatively low loss of lithium during cell operation. Therefore, in contrast to prior art lithium metal rechargeable cells which require a large excess of lithium to maintain acceptable cycling performance, no lithium excess is needed in the rechargeable lithium cells of the present invention. This has the advantage of resulting in an increased cell capacity and higher energy density of the cells, while simultaneously improving the cell's safety.

The construction and operation of the rechargeable lithium cells of the present invention, is disclosed in more detail with respect to the specific non-limiting examples of the present invention described in examples 1-7 below.

EXAMPLE 1

An AA size test cell was fabricated using the following components. The anode was constructed from a copper foil (having a thickness of twelve microns). The copper foil was coated on both sides with a layer of a carbonaceous material mixture of graphite: PVDF (90:10 w %) having a thickness of 30 microns (per side). The total thickness of the anode was 72 microns. The width of the anode was 41 millimeters and the length of the anode was 320 millimeters.

The cathode was made of a mixture of $LiAlNiCoO_2$, carbon powder, and PVDF (90%, 5% and 5% by weight, respectively). This mixture was pressed on both sides of an aluminum foil support having a thickness of fifteen microns. The carbon powder in the mixture increased the electrical conductivity of the cathode and the PVDF was used as a binder. The total thickness of the cathode was 245 microns. The width of the cathode was 39 millimeters, and the length of the cathode was 280 millimeters.

The cathode and anode were separated by a suitable separator strip of Microporous polypropylene (cellgard type 2325) disposed between the anode and the cathode). The electrolyte used in the cell was 1 molar $LiPF_6$ in a mixture of EC:DMC:DEC.

The cell's stack (including the anode, the cathode and the separator sandwiched between them) was assembled in a spirally wound configuration, as is known in the art, and inserted into a can made of nickel-plated steel. A nickel-plated steel cover was hermetically sealed to the can by laser welding. The electrolyte was introduced to the cell through an opening having a one millimeter diameter, formed in the can's bottom. After the introduction of the electrolyte the opening in the bottom part of the can was closed by resistance welding. About one hour after the filling of the electrolyte, the cell open circuit voltage had stabilized at about 0.3 Volt. The cell was charged for about twelve hours by a constant current of 100 mA to a cutoff voltage of 4.1 Volts. The cell was then discharged at a current of 250 mA to a cutoff at 2.5 Volts and delivered 950 mAh capacity.

EXAMPLE 2

A lithium cell was made as described in EXAMPLE 1 above except that the anode support was made of a nickel foil having a thickness of twenty five microns (instead of the copper foil of EXAMPLE 1) and the overall thickness of the anode was eighty five microns. The cell was charged and discharged under the same cycle profile as in EXAMPLE 1. Under 250 mA the discharged capacity was 950 mAh.

EXAMPLE 3

A lithium cell was made as described in EXAMPLE 1 above except that the active material of the cathode was made of $LiCoO_2$ (instead of $LiAlNiCoO_2$). Fifteen charge/discharge cycles were performed using the same profile as described for the cell of EXAMPLE 1. Under 250 mA the first discharged capacity was 920 mAh and decreased to 910 mAh in the fifteenth cycle.

EXAMPLE 4

A lithium cell was made as described in EXAMPLE 1 above except that the thickness of the graphite:PVDF coating of the anode was only 15 microns on each side of the copper foil. The total thickness of the anode was forty two microns. The length of the anode was 345 millimeters, and the length of the cathode was 315 millimeters. The cell was charged and discharged at the same current of EXAMPLE 1 and delivered a capacity of 1050 mAh at the first discharge.

EXAMPLE 5

Figure 3:
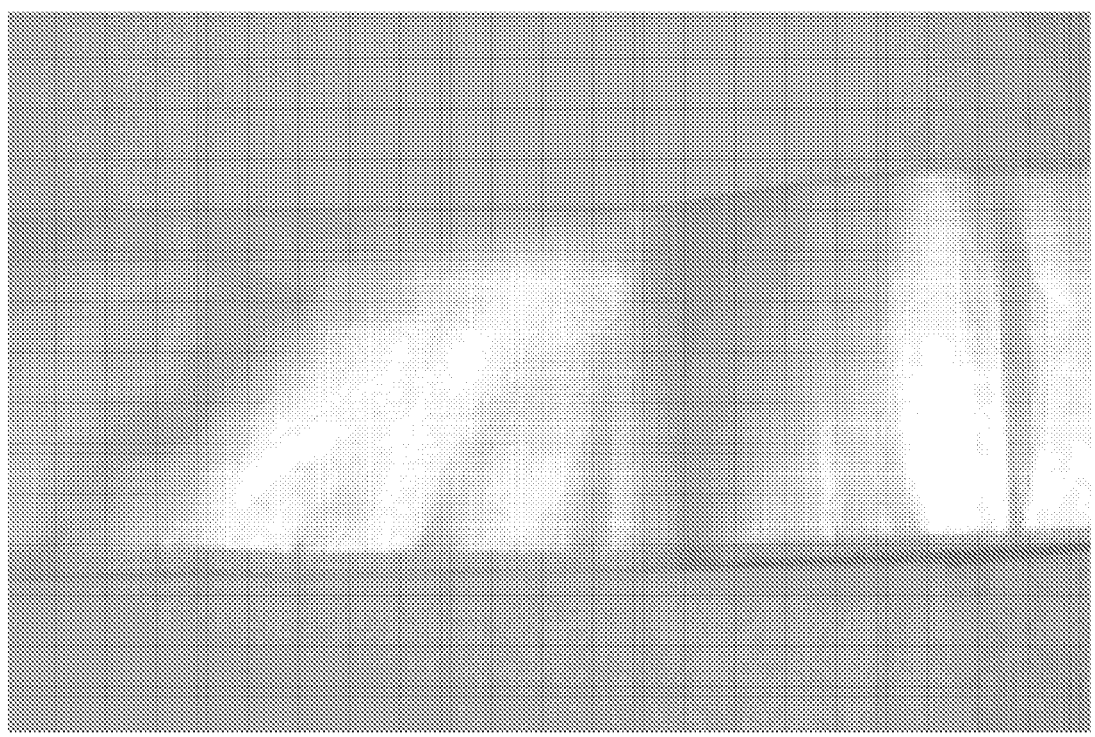
FIG. 3 is a photograph illustrating the surface of a metallic lithium layer formed on the carbonaceous material of the anode during the charging half-cycle of a rechargeable cell constructed in accordance with an embodiment of the present invention.

A lithium cell was made as described above in EXAMPLE 1. After the first charging process the cell was cut open and the anode appearance was visually inspected and photographed. Reference is now made to FIG. 3 which is a photograph illustrating the surface of the metallic lithium layer formed on the carbonaceous material of the anode during the charging half-cycle of a rechargeable cell of EXAMPLE 5 immediately after cutting open the cell. The surface of the anode was found to be coated by a layer of very smooth and shiny lithium metal with excellent adhesion to the carbonaceous material of the anode and to the metal support (the copper foil).

EXAMPLE 6

A lithium cell was made as described in EXAMPLE 1 above except that the anode copper metal support was coated with carbon using a vacuum deposition technique. The thickness of the carbon coating was about 1.5 micron, and the thickness of the cathode was 302 microns. The cell delivered a capacity of 1210 mAh during the first discharge.

EXAMPLE 7

A lithium cell was made as described in EXAMPLE 1. After the first charging the cell was stored for 14 days at a constant temperature of 72° C. followed by a constant current discharge of 250 mA. The cell's delivery capacity was 930 mAh, as compared to the 950 mAh capacity of the first discharge of the non-stored cell of EXAMPLE 1.

It is noted that while the above examples of the electrochemical cells of the present invention are illustrated in the drawing figures as implemented using a spirally wound cell stack configuration, it may also possible to construct the electrochemical cells of the present invention using any other suitable cell construction method or configuration known in the art, such as but not limited to, button type cells, flat cells, or any other type of suitable cell configuration known in the art.

It is further noted that the present invention is not intended to be limited to the examples illustrated in the drawings and described herein and that many variations and permutations of the cells of electrochemical cells of the present invention may be made by the person skilled in the art, including but not limited to variations in the construction, assembly, dimensions and configuration of the cell, and in the construction and composition of the anode, the cathode, the carbonaceous material, the lithium intercalation compounds used, the electrolyte and/or separator (if used) and the cell's housing. All such changes are considered to be within the scope and spirit of the present invention.

The invention claimed is:

1. An electrochemical cell comprising:
   an anode comprising a copper foil supporting member and, a carbonaceous material attached to said supporting member, said carbonaceous material includes a mixture of 90% graphite and 10% Poly Vinylidene difluoride that is capable of reversibly incorporating lithium ions therein and lithium metal on the surface thereof;
   a cathode capable of reversibly incorporating therein lithium ions, said cathode includes an electrically conducting aluminum support member and a mixture of 90% LiAlNiCoO$_2$, 5% carbon powder, and 5% Poly Vinylidene difluoride attached to said aluminum support member; and
   a non-aqueous electrolyte including 1 molar LiPF$_6$ in a mixture of ethylene carbonate, dimethyl-carbonate and diethyl-carbonate in contact with said anode and said cathode;
   wherein the ratio of the capacity to reversibly incorporate lithium ions of said cathode to the capacity to reversibly incorporate lithium ions in the form of LiC$_6$ of said carbonaceous material of said anode is equal to 4.5:1,
   wherein in the fully charged state of said electrochemical cell at an open circuit voltage of 4.1 Volt, said carbonaceous material of said anode has a layer of metallic lithium deposited thereupon, said layer of metallic lithium accounts for 77.8% or more of the electrical charge capacity of said cell at said fully charged state, and wherein the charge retention capacity of said electrochemical cell, after the fully charged cell is stored for 14 days at a temperature of 72° C. followed by a constant current discharge of 250 mA to a cutoff at 2.5 Volt, is higher than 97.9%.

2. The cell according to claim 1 wherein said cell is selected from a primary electrochemical cell and a rechargeable electrochemical cell.

3. The cell according to claim 1 wherein said cell further includes a separator for separating said cathode from said anode and wherein said electrolyte impregnates said separator.

4. An electrochemical cell comprising:
   an anode comprising a copper foil support member and, and a carbonaceous material including a mixture of 90% graphite and 10% Poly Vinylidenedifluoride that is attached to said support member, said carbonaceous material is capable of reversibly incorporating lithium ions therein and lithium metal on the surface thereof;
   a cathode capable of reversibly incorporating therein lithium ions, said cathode includes an electrically conducting aluminum support member and a mixture of 90% LiAlNiCoO$_2$, 5% carbon powder, and 5% Poly Vinylidene difluoride attached to said aluminum support member; and
   a non-aqueous electrolyte including 1 molar LiPF$_6$ in a mixture of ethylene carbonate, dimethyl-carbonate and diethyl-carbonate in contact with said anode and said cathode;
   wherein prior to charging said cell, said cathode is lithiated by an amount of reversible lithium ions that is equal to 4.5 times the capacity of said carbonaceous material of said anode to intercalate therein lithium ions in the form of LiC$_6$, and wherein in the fully charged state of said electrochemical cell at an open circuit voltage of 4.1 Volt, said carbonaceous material of said anode has a layer of metallic lithium deposited thereupon, said layer of metallic lithium accounts for 77.8% or more of the electrical charge capacity of said cell at said fully charged state, and wherein the charge retention capacity of said electrochemical cell, after the fully charged cell is stored for 14 days at a constant temperature of 72° C. followed by a constant current discharge of 250 mA to a cutoff at 2.5 Volt, is 97.9%.

5. A method for constructing an electrochemical cell, the method comprising the steps of:
   providing an anode comprising a copper foil support member and, a carbonaceous material including a mixture of 90% graphite and 10% Poly Vinylidenedifluoride that is attached to said support member, said carbonaceous material is capable of reversibly incorporating lithium ions therein and lithium metal on the surface thereof;
   providing a cathode capable of reversibly incorporating therein lithium ions, said cathode includes an electrically conducting aluminum support member and a mixture of 90% LiAlNiCoO$_2$, 5% carbon powder and 5% Poly Vinylidene difluoride attached to said aluminum support member, wherein the ratio of the reversible capacity to incorporate lithium ions of said cathode to the reversible capacity for incorporating lithium ions in the form of $LiC_6$ of said carbonaceous material of said anode is equal to 4.5:1, such that in the fully charged state of said electrochemical cell at an open circuit voltage of 4.1 Volt, said carbonaceous material of said anode has a layer of metallic lithium deposited thereupon, said layer of metallic lithium accounts for 77.8% or more of the electrical charge capacity of said cell at said fully charged state, wherein the charge retention capacity of said electrochemical cell, after the fully charged cell is stored for 14 days at a constant temperature of 72° C. followed by a constant current discharge of 250 mA to a cutoff at 2.5 Volt, is 97.9%;

providing a non-aqueous electrolyte electrolyte including 1 molar $LiPF_6$ in a mixture of ethylene carbonate, dimethyl-carbonate and diethyl-carbonate; and assembling said cathode, said anode and said electrolyte in a housing to obtain said electrochemical cell.

6. A method for constructing An electrochemical cell, the method comprising the steps of:

providing an anode comprising a copper foil support member and, a carbonaceous material attached to a support member, said carbonaceous material includes a mixture of 90% graphite and 10% Poly Vinylidene difluoride that is capable of reversibly incorporating lithium ions therein and lithium metal on the surface thereof;

providing a cathode capable of reversibly intercalating therein lithium ions said cathode includes an electrically conducting aluminum support member and a mixture of 90% $LiAlNiCoO_7$, 5% carbon powder, and 5% Poly Vinylidene difluoride attached to said aluminum support member, wherein in the cell's discharged state said cathode is lithiated by an amount of reversible lithium ions that is equal to 4.5 times the capacity of said carbonaceous material of said anode to intercalate therein lithium ions in the form of $LiC_6$, such that in the fully charged state of said electrochemical cell at an open circuit voltage of 4.1 Volt, said carbonaceous material of said anode has a layer of metallic lithium deposited thereupon, said layer of metallic lithium accounts for 77.8% or more of the electrical charge capacity of said cell at said fully charged state, wherein the charge retention capacity of said electrochemical cell, after the fully charged cell is stored for 14 days at a constant temperature of 72° C. followed by a constant current discharge of 250 mA to a cutoff at 2.5 Volt, is 97.9%;

providing a non-aqueous electrolyte electrolyte including 1 molar $LiPF_6$ in a mixture of ethylene carbonate, dimethyl-carbonate and diethyl-carbonate;

assembling said cathode, said anode and said electrolyte in a housing to obtain said electrochemical cell.

7. The method according to claim 6 further including the step of sealing said housing.

8. The method according to claim 6 further including the step of charging said electrochemical cell after said step of assembling.

9. The method according to claim 6 further including the step of charging said electrochemical cell to deposit said metallic lithium on said carbonaceous material.

10. The method according to claim 9 wherein the depositing of said metallic lithium on said carbonaceous material increases the internal pressure within said cell to reduce lithium dendrite formation.

* * * * *